United States Patent [19]

Jönsson

[11] 4,355,197

[45] Oct. 19, 1982

[54] SERVICE LINE TERMINAL BOX SYSTEM, ESPECIALLY FOR SHIPS MOORED TO QUAYS

[75] Inventor: Lennart C. B. Jönsson, Höllviksnäs, Sweden

[73] Assignees: Ann-Marie Jönsson; Jane Jönsson; Asa Jönsson, all of Höllviksnäs, Sweden

[21] Appl. No.: 196,222

[22] PCT Filed: Sep. 13, 1979

[86] PCT No.: PCT/SE79/00187
§ 371 Date: May 6, 1980
§ 102(e) Date: May 6, 1980

[87] PCT Pub. No.: WO80/00583
PCT Pub. Date: Apr. 3, 1980

[30] Foreign Application Priority Data

Sep. 15, 1978 [SE] Sweden .................. 7809720

[51] Int. Cl.³ .................. E02B 3/20; E03B 9/08; H02G 9/00
[52] U.S. Cl. .................. 174/37; 137/363; 138/33; 174/48; 339/44 R; 404/25
[58] Field of Search .................. 174/37, 38, 39, 48, 174/49; 52/20, 221; 137/236 S, 297, 301, 356, 363; 138/33; 191/12 R; 219/209, 213; 220/3.3, 3.5; 339/34, 44 R, 44 M; 361/332, 356, 364; 404/3, 25; 405/218, 303

[56] References Cited

U.S. PATENT DOCUMENTS

| | | | |
|---|---|---|---|
| 650,432 | 5/1900 | Stewart | 339/44 R X |
| 904,898 | 11/1908 | Russell | 339/44 R |
| 945,753 | 1/1910 | Chamberlain et al. | 404/25 X |
| 1,582,557 | 4/1926 | Swanton et al. | 404/3 |
| 3,131,512 | 5/1964 | MacLeod, Jr. | 220/3.3 X |
| 3,135,821 | 6/1964 | Lanham | 174/48 |
| 3,864,883 | 2/1975 | McMarlin | 174/48 X |

FOREIGN PATENT DOCUMENTS

| | | | |
|---|---|---|---|
| 2144810 | 3/1973 | Fed. Rep. of Germany | 52/221 |
| 1017548 | 1/1966 | United Kingdom | 339/44 R |

*Primary Examiner*—Laramie E. Askin
*Attorney, Agent, or Firm*—Beveridge, DeGrandi and Kline

[57] ABSTRACT

A system for primarily supplying fishing boats lying berthed in harbor with electrical power, comprises a plurality of terminal boxes (1) which are countersunk along the edge of the quay and each contains electric power socket outlets (2), a drain hole (10) and a heating cable (19). The coverplate (5) of each box is self-closing, self-locking and lies on ground level, leaving in closed position an opening to the interior of the terminal box to permit passing therethrough a line (16) connectible to the electric power socket outlet and extending from an electrical connection box (18) which can be mounted on a boat (17) and has several electric power socket outlets and an electricity meter. In addition to electric power socket outlets, outlets for water, telephone service, compressed air, vacuum and/or fuel can be mounted in the boxes which can also be placed in airports and on camping sites.

8 Claims, 2 Drawing Figures

SERVICE LINE TERMINAL BOX SYSTEM, ESPECIALLY FOR SHIPS MOORED TO QUAYS

This invention relates to a service line terminal box system especially for ships moored to quays but also for aircraft in airports, caravans on camping sites and the like.

When ships, pleasure boats and particularly fishing boats lie berthed in harbour they need to have the use of electrical power from the public mains. To satisfy this requirement, mostly rather provisional arrangements have been provided hitherto, comprising distribution boxes from which overhead lines are temporarily drawn to the different boats. These prior-art arrangements suffer from obvious drawbacks with regard to security. The same conditions prevail on camping sites and in airports as well.

The primary object of the present invention therefore is to provide an outdoor terminal box system which ensures improved security and particularly serves to supply fishing boats moored to quays with electrical power. However, the terminal box is also more generally useful, for example, for the supply of water and/or fuel.

To this end, the invention provides a service line terminal box system supplying, at predetermined points outdoors, such facilities as electrical power, telephone service, water, compressed air, vacuum and/or fuel particularly for ships moored to quays. This terminal box system comprises a plurality of service line terminal boxes, a coverplate countersunk in the ground at the predetermined points for each of the boxes, over which coverplate vehicles can be driven and which is self-locking and in closed position leaves an opening to the interior of the box to permit passing therethrough a line temporarily connectible to a service line socket outlet in the box, the bottom of each of the boxes being inclined towards a drain hole connected to a drain pipe, and one or more service lines fixedly connected through holes in the walls of the box to the service line socket outlet in the box.

The invention will be described in greater detail below with reference to the accompanying drawing which illustrates an embodiment of the service line terminal box system for supplying ships with electrical power.

Figure 1:
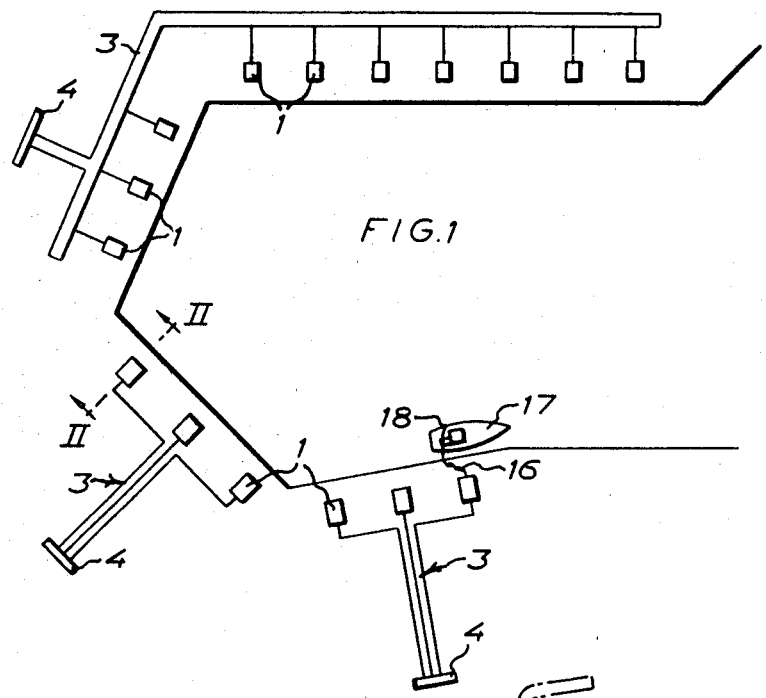
FIG. 1 is a top plan view of a harbour quay structure.

In the harbour shown in FIG. 1, a plurality of service line terminal boxes 1 are countersunk in the quay short of the edge thereof. Each of the boxes contains three one-phase electrical socket outlets 2 (see FIG. 2) which are energized via underground cables 3 from distribution boxes 4 which in turn are connected to the public mains. Each box 1 can contain, for exaample, three one-phase socket outlets 2 of 16 A each, but can alternatively contain two three-phase socket outlets of 32 A each, or one three-phase socket outlet of 63 A.

Figure 2:
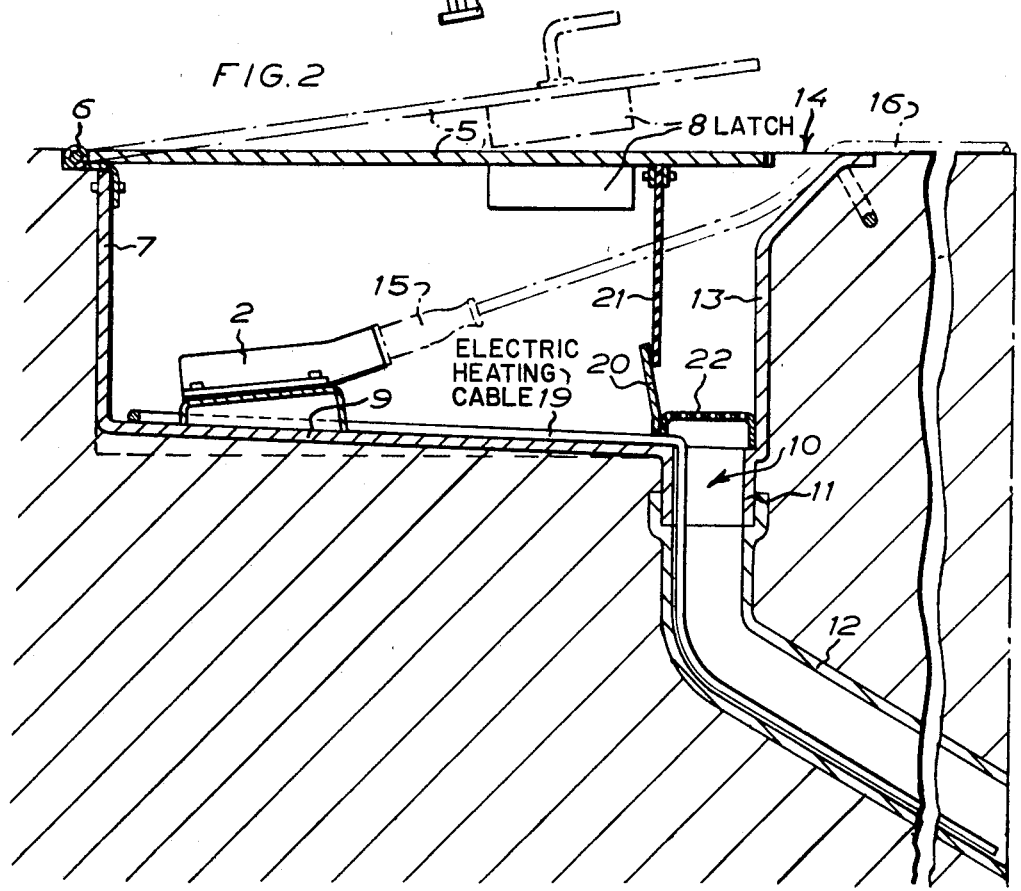
FIG. 2 is a cross-section on the line II—II in FIG. 1.

The substantially parallelpipedical terminal box 1 has bent and welded-together walls of sheet steel and a coverplate 5 likewise of sheet steel, which is connected by hinges 6 to one short side wall 7 of the housing and in closed position also rests on the upper edges of the long side walls such that vehicles can be driven over the coverplate 5. The hinges 6 can be designed in a manner known per se such that the maximum opening angle of the coverplate 5 is less than 90°, which means that on being opened the coverplate cannot be set in a stable position. A maximum opening angle of less than 90° can also be achieved by such a hinge arrangement as is shown in FIG. 2. As a result, once the coverplate 5 is not retained in open position it will fall by gravity into closed position in which the coverplate 5 is besides automatically locked, for example, by means of a latch 8. Thus, the coverplate 5 is self-closing and can only be opened by means of a key.

The bottom 9 of the box is inclined towards a drain hole 10 which is surrounded by a flange 11 to which there can be mounted a drain pipe 12 extending outwardly to the edge of the quay.

The other short side wall 13 of the box is deflected outwardly at an angle at its upper portion such that a slot-shaped opening 14 is formed, of sufficient width to accommodate an electrical cable without any risk of squeezing it. Further, the opening is positioned on the same side as the drain hole 10 so that water entering the opening 14 will be led directly out through the hole 10 and the pipe 12.

As shown by dot lines in FIG. 2 a plug 15 at the end of a line 16 can be inserted in the socket outlet 2 while the coverplate 5 is open. As indicated in FIG. 1, the line 16 extends to an electrical connection box 18 removably mounted on a boat 17. The connection box 18 in turn contains a plurality of electrical socket outlets with associated fuses, and besides an electricity meter.

The supply lines 3 can be laid in individual trenches, as indicated in the lower portion of FIG. 1, or be placed in a common covered trench extending beyond the terminal boxes 1, as indicated in the upper portion of FIG. 1.

To prevent ice formation in the box 1 or the pipe 12 a heating cable 19 can be disposed round the bottom 9 of the housing 1 and throughout the pipe 12. To avoid that water flowing downward through the opening 14 splashes onto the socket outlet 2, a splash plate 20 is arranged in an obliquely upstanding position from the bottom 9 between the hole 10 and the socket outlet 2. Further, a depending rubber skirt 21 is mounted at the under surface of the coverplate 5. As will appear from FIG. 2, the skirt 21 overlaps the splash plate 20 when the coverplate 5 is closed. For withdrawal of the line 16 the rubber skirt 21 may have a vertical slot extending from the lower edge thereof. Moreover, a grid 22 is disposed over the drain hole 10 to prevent clogging of the pipe 12. Finally, it should be mentioned that the hinge 6 is screwed to the inner side of the wall 7 such that the coverplate 5, if necessary, can be removed although it is countersunk on a level with the surrounding ground surface.

In view of security, the above-described system requires earth fault breakers and may need to be equipped with submersible electrical connecting socket outlets 2.

While the above-described embodiment of the invention is concerned with electrical socket outlets, it is obvious that other types of service line socket outlets, for example, for telephone service, water, compressed air, vacuum and/or fuel can be similarly arranged. Though being particularly well suited for electric power supply purposes, the invention is not limited to such a use. It is also obvious that the invention is useful in other connections than with the above-described harbour quay structure, namely whenever it is desired to have the temporary use of say electrical power, telephone service, water, compressed air, vacuum and/or fuel at predetermined points outdoors. The connection of the drain pipe 12 must of course be adapted to the use concerned.

I claim:

1. A service line terminal box system for supplying facilities at predetermined points outdoors, comprising a plurality of service line terminal boxes positioned at predetermined points in a surface located outdoors and each having four side walls and a bottom which is inclined towards a drain hole connected to a drain pipe, a coverplate for each of the boxes countersunk in said surface at the predetermined points of the boxes, over which coverplates vehicles can be driven, each coverplate being self-locking and in closed position resting on the upper edges of three of the four side walls of the respective terminal box, a service line socket outlet in each box, the upper part of the fourth side wall of each box being deflected outwardly to form an opening to the interior of the box to permit passing therethrough a line releasably connectible to the service line socket outlet in the box, the drain hole of each box being positioned adjacent the fourth side wall, one or more service supply lines fixedly connected through holes in the walls of each box to the service line socket outlet in the box, and each of the boxes having a splash plate extending from the bottom of the box toward the coverplate, said splash plate being situated between the drain hole and the service line socket outlet.

2. System as claimed in claim 1, wherein each service line terminal box has a heating cable loop which extends around the bottom of the box and throughout the drain pipe.

3. System as claimed in claim 1, wherein each drain hole is surrounded by a flange to which the respective drain pipe is fixed.

4. System as claimed in claim 1, comprising a covered trench extending along the terminal boxes, the service supply lines being laid in said trench.

5. System as claimed in claim 1, wherein each coverplate is secured to the side of the respective box opposite to the opening by means of hinges so arranged that on being opened, the coverplate cannot be set in a stable position.

6. System as claimed in claim 1, the service line socket outlets comprising an electric power socket outlet, and a line releasably connected at one end to the electrical power socket outlet and fixedly connected at its other end to an electrical connection box.

7. System as claimed in claim 1, wherein said service supply lines comprise one or more lines of electrical power, telephone service, water, compressed air, vacuum and fuel.

8. System as claimed in claim 1, wherein said terminal boxes are located in a quay for providing facilities to moored ships.

* * * * *